United States Patent [19]

Nishigaki et al.

[11] Patent Number: 4,556,511

[45] Date of Patent: Dec. 3, 1985

[54] FLAME RESISTANT OIL

[75] Inventors: Haruo Nishigaki; Koji Watanabe, both of Nagoya; Shiroh Fukui; Kiyoshi Kanematsu, both of Chiba, all of Japan

[73] Assignees: Asahi Glass Co., Ltd.; Mitsubishi Denki Kabushiki Kaisha, both of Tokyo, Japan

[21] Appl. No.: 617,536

[22] Filed: Jun. 5, 1984

[30] Foreign Application Priority Data

Jun. 6, 1983 [JP] Japan .................................. 58-99486

[51] Int. Cl.[4] .......................... C10M 1/32; H01B 3/46; H01F 27/10; H01G 13/04

[52] U.S. Cl. .................................... 252/573; 252/78.1; 252/78.3; 252/570; 252/601; 252/609; 106/15.05; 106/287.13; 336/58; 336/94

[58] Field of Search ..................... 252/78.1, 78.3, 570, 252/573, 601, 609; 106/15.05, 287.13; 336/58, 94

[56] References Cited

U.S. PATENT DOCUMENTS 2,927,893 3/1960 Neunherz ........................... 252/49.6
3,591,506 7/1971 Peeler et al. ........................ 252/78.3
3,748,372 7/1973 McMahon et al. ................. 252/573
4,155,864 5/1979 Martin .................................. 336/94
4,431,579 2/1984 Yasufuku .............................. 336/94

FOREIGN PATENT DOCUMENTS 49-129899 12/1974 Japan .
791760 3/1958 United Kingdom .

*Primary Examiner*—Paul Lieberman
*Assistant Examiner*—Robert A. Wax
*Attorney, Agent, or Firm*—Oblon, Fisher, Spivak, McClelland & Maier

[57] ABSTRACT

A flame resistant oil comprising a fluorine-type oil having a number average molecular weight of from about 300 to about 900 and a silicone oil having a number average molecular weight of from about 160 to about 57,000, wherein the fluorine-type oil and the silicone oil are combined and dissolved to each other with a combination of the respective molecular weights selected from the following combinations I to IV:

| | |
|---|---|
| I | $300 \leq X \leq 900$ |
| | $160 \leq Y < 400$ |
| II | $300 \leq X \leq 700 + 0.02Z^2$ |
| | $400 \leq Y < 2{,}000$ |
| III | $300 \leq X \leq 600 + 0.02Z^2$ |
| | $2{,}000 \leq Y < 4{,}000$ |
| IV | $300 \leq X \leq 500 + 0.02Z^2$ |
| | $4{,}000 \leq Y \leq 57{,}000$ |

where X is the number average molecular weight of the fluorine-type oil, Y is the number average molecular weight of the silicone oil, and Z is the % by volume of the silicone oil in the flame resistant oil and $10 \leq Z \leq 90$.

11 Claims, No Drawings

FLAME RESISTANT OIL

The present invention relates to a flame resistant oil comprising a fluorine-type oil and a silicone oil wherein their molecular weights are adjusted to improve the compatibility.

Mineral oils, phosphate oils, chlorinated synthetic oils, sulfone synthetic oils, silicone oils, fluorine-type oils, etc. are known as insulating oils for electric equipments or instruments such as power cables, capacitors, transformers, etc. These insulating oils are required to have not only good electric characteristics such as dielectric breakdown voltage, volume resistivity, permittivity or dielectric loss tangent, but also physical and chemical stability or non-toxicity, non-flammability and low temperature fluidity. The conventional insulating oils do not necessarily satisfy all of these requirements. For instance, mineral oils or low viscosity silicone oils are flammable; chlorinated synthetic oils have a problem with respect to their toxicity; and fluorine-type oils are expensive and have a high specific gravity which tends to increase the weight of the electric equipments.

Japanese Examined Patent Publication No. 20720/1976 discloses an insulating oil prepared by mixing a silicone oil and a fluorine-type oil to complement the shortcomings of the respective oils. Namely, the silicon oil is made non-flammable when combined with the fluorine-type oil. On the other hand, the specific gravity of the fluorine-type oil can be reduced by the incorporation of the silicon oil. Further, this publication mentions that the compatibility of the silicone oil with the fluorine-type oil is poor, and the compatibility is improved by an addition of a melamine derivative or isocyanurate.

The present invention is directed to a flame resistant oil comprising a fluorine-type oil and a silicone oil, wherein the molecular weights of the fluorine-type oil and the silicon oil are selected to make them compatible with each other, whereby no additive is required to improve the compatibility. Further, it is possible to broaden the compatible range of the molecular weight of the fluorine-type oil by increasing the mixing ratio of the silicone oil in the flame resistant oil.

Namely, the present invention provides a flame resistant oil comprising a fluorine-type oil having a number average molecular weight of from about 300 to about 900 and a silicone oil having a number average molecular weight of from about 160 to about 57,000, wherein the fluorine-type oil and the silicone oil are combined and dissolved to each other with a combination of the respective molecular weights selected from the following combinations I to IV.

| | |
|---|---|
| I | $300 \leqq X \leqq 900$<br>$160 \leqq Y < 400$ |
| II | $300 \leqq X \leqq 700 + 0.02Z^2$<br>$400 \leqq Y < 2,000$ |
| III | $300 \leqq X \leqq 600 + 0.02Z^2$<br>$2,000 \leqq Y < 4,000$ |
| IV | $300 \leqq X \leqq 500 + 0.02Z^2$<br>$4,000 \leqq Y \leqq 57,000$ |

where X is the number average molecular weight of the fluorine-type oil, Y is the number average molecular weight of the silicone oil, and Z is the % by volume of the silicone oil in the flame resistant oil and $10 \leqq Z \leqq 90$.

Now, the present invention will be described in detail with reference to the preferred embodiments.

A typical example of the fluorine-type oil is a chlorotrifluoroethylene low molecular weight polymer obtained by the polymerization of chlorotrifluoroethylene. As other examples of the fluorine-type oil, there may be mentioned a fluorine-containing low molecular weight polymer obtained by the polymerization of tetrafluoroethylene with propylene, a perfluoroether oligomer, a fluorinated oxetane, a fluorinated polyphenyl ether, and a perfluoroamine.

As typical examples of the silicone oil, there may be mentioned chained organopolysiloxanes represented by the general formula of $(SiRR'O)_n$ where each of R and R' is $-CH_3$, $-OH$ or $-C_6H_5$. Specifically, there may be mentioned dimethylpolysiloxane or phenylmethylpolysiloxane.

The above-mentioned fluorine-type oil and silicone oil can be uniformly mixed irrespective of the mixing ratio when the fluorine-type oil has a number average molecular weight (hereinafter sometimes referred to simply as "a molecular weight") of from about 300 to about 700, and the silicone oil has a number average molecular weight of from about 160 to about 1,900. The greater the molecular weight of the silicone oil becomes beyond the above range, the smaller becomes the mixing ratio of the fluorine-type oil which satisfies the compatibility. However, with an increase of the molecular weight of the silicone oil, i.e. with an increase of the viscosity, the flame resistance will increase, and accordingly the mixing ratio of the fluorine-type oil may be small, and no inconvenience will be brought about for a normal application at a temperature range of from −30° to 150° C. For an application at a low temperature of less than −30° C., it is desirable that the mixing ratio of the silicone oil is set to be high enough to make it readily compatible. The mixing ratio of the silicone oil in the flame resistant oil is preferably selected within a range of $10 \leqq Z \leqq 90$. In order to render the flame resistant oil non-inflammable, it is advisable to select the mixing ratio of the silicone oil within the range of $10 \leqq Z \leqq 50$.

The compatible range of the molecular weight is wider for the silicone oil than for the fluorine-type oil. Further, the smaller the molecular weight of the fluorine-type oil is, the wider the compatible range of the molecular weight of the silicone oil becomes. For instance, when a silicone oil and a fluorine-type oil are mixed at 25° C. in a volume ratio of the silicone oil to the fluorine-type oil of 9 to 1, a fluorine-type oil having a molecular weight of about 700 is capable of uniformly dissolving a silicone oil having a molecular weight of upto about 57,000. On the other hand, in the case of a fluorine-type oil having a molecular weight of about 800, a silicone oil compatible under the same condition is restricted to the one having a molecular weight of upto about 3,700. It is evident from the data given in Tables 2 to 7 that in the case of a flame resistant oil wherein X is from about 300 to about 900, and Y is from about 160 to about 400, the fluorine-type oil and the silicone oil are compatible with each other irrespective of the mixing ratio i.e. at any mixing ratio. In the case where X is from about 300 to about 700, it is compatible with a silicone oil wherein Y is from about 400 to about 2,000, at any mixing ratio. Likewise, when X is from about 300 to about 600, the fluorine-type oil is compatible with a silicone oil wherein Y is from about 2,000 to about 4,000 at any mixing ratio, and when X is from about 300 to about 500, the flurorine-type oil is compatible with a silicone oil wherein Y is from about 4,000 to about 57,000 irrespective of the mixing ratio. On the other hand, the molecular weight of the fluorine-type oil compatible with the silicone oil wherein Y is from about 400 to about 57,000, increases in a quadratic function with an increase of Z. For instance, the molecular weight X of the fluorine-type oil compatible with the silicone oil increases by about $0.02Z^2$ where Z is the mixing ratio of the silicone oil, and the value X becomes to be $X_1+0.02Z^2$ where $X_1$ is the molecular weight X of the fluorine-type oil compatible at any mixing ratio. In order to freely select the mixing ratio of the two oils within a temperature range of from −30° to 150° C. for a usual application of an insulating oil, the compatible molecular weights of the fluorine-type oil and the silicone oil are selected within ranges of from about 300 to about 900 and from about 160 to about 57,000, respectively. In a case where non-flammability is desired, the mixing ratio of the fluorine-type oil is increased, and in a case where the weight of the insulating oil is to be reduced, the mixing ratio of the silicone oil is increased.

When the flame resistant oil is used as an insulating oil, it is expected not only to provide an electric insulating property but also to cool the coil, etc. In such a case, it is required to have a low viscosity so that the generated heat can readily be dissipated. Further, when it is used as an insulating oil for outdoor transformers, it is expected to properly function at a temperature as low as −15° C. or lower, and it is required to maintain adequate fluidity and compatibility even at such a low temperature.

When used as an insulating oil, the flame resistant oil of the present invention provides not only adequate electric characteristics but also excellent fluidity and compatibility at such a low temperature. Further, when impurities such as unsaturated compounds are present in the insulating oil, it is likely that the deterioration of the insulating oil proceeds. Therefore, for instance, when a very small amount of impurities is present in a fluorine-type oil, it is preferred to stabilize it by a usual method such as fluorinating treatment with use of a fluorinating agent such as $ClF_3$, $MnF_3$, $AgF_2$ or $CoF_3$, or treatment with nascent chlorine. Further, in order to improve the oxidation stability or thermal stability, benzofuran, 1,2-benzopyran, an epoxy compound, an organic tin compound, an episulfide derivative, a cyclic silane compound, a phosphite compound, a phosphine sulfide compound or other known stabilizers, may be incorporated to the flame resistant oil of the present invention.

The flame resistant oil of the present invention also has characteristics as a heat resistant medium, and therefore it is useful not only as an electric insulating oil, but also as e.g. a lubricant, a heating or cooling medium, or an operation oil.

Now, the present invention will be described in further detail with reference to an Example. However, it should be understood that the present invention is by no means restricted by this specific Example.

EXAMPLE

In Tables 2 to 7, the compatibility of a chlorotrifluoroethylene low molecular weight polymer with dimethylpolysiloxane at 25° C. is shown. In the Tables, the symbol mark "O" represents a uniform mixture, and the symbol mark "X" represents incompatibility or phase separation.

Table 1 shows the results of the measurements of various characteristics of the chlorotrifluoroethylene low molecular weight polymer/dimethylpolysiloxane type insulating oils of the present invention.

TABLE 1

| | Insulating oils and their compositions (volume ratios) | | | | | | | | | | | |
|---|---|---|---|---|---|---|---|---|---|---|---|---|
| | Fluorine-type oil Molecular weight | | Silicone oil Molecular weight | | Specific gravity | Flammability*1 (Glass tape method) | Flash point (COC) | Kinetic viscosity (40° C.) | Pour point | Volume resistivity (80° C.) | Dielectric loss tangent (80° C.) | Permittivity (80° C.) |
| | 600 | 800 | 1900 | 3700 | (15/4° C.) | | [°C.] | [cst] | [°C.] | [Ω-cm] | [%] | |
| Example | 50 | | 50 | | 1.428 | Non-flammable | None | 16.1 | <−50 | $1.8 \times 10^{14}$ | 0.10 | 2.58 |
| | 50 | | | 50 | 1.436 | Non-flammable | None | 24.4 | <−50 | $1.1 \times 10^{14}$ | 0.10 | 2.66 |
| | | 10 | 90 | | 1.060 | Flame extinction | 250 | 25.9 | −40 | $1.0 \times 10^{14}$ | 0.07 | 2.58 |
| | | 10 | | 90 | 1.071 | Flame extinction | 315 | 51.4 | <−50 | $2.0 \times 10^{14}$ | 0.05 | 2.67 |
| Comparative Example | 100 | | | | 1.889 | Non-flammable | None | 14.6 | <−50 | $1.0 \times 10^{14}$ | 0.10 | 2.69 |
| | | 100 | | | 1.970 | Non-flammable | None | 215.7 | −25 | $1.1 \times 10^{14}$ | 0.10 | 2.74 |
| | | | 100 | | 0.948 | Hardly flammable | 250 | 26.4 | <−50 | $3.0 \times 10^{14}$ | 0.06 | 2.62 |
| | | | | 100 | 0.971 | Hardly flammable | 315 | 56.6 | <−50 | $2.5 \times 10^{14}$ | 0.04 | 2.65 |

*1Test method: JIS C 2101-1982R
Non-flammable: No flame
Flame extinction: The flame was extinguished after catching fire
Hardly flammable: Combustion speed ≦ 1.5 mm/s

TABLE 2

Silicone oil — Average molecular weight: 160; Viscosity: 0.65 cst

| Average molecular weight of the fluorine-type oil | | | |
|---|---|---|---|
| 900 | O O | O | O O |
| 800 | O O | O | O O |
| 700 | O O | O | O O |
| 600 | O O | O | O O |
| 500 | O O | O | O O |
| 400 | O O | O | O O |
| 300 | O O | O | O O |

Silicone oil: 0 — 50 — 100
Fluorine-type oil [Vol %]: 100 — 50 — 0

TABLE 3

Silicone oil — Average molecular weight: 1900; Viscosity: 20 cst

| Average molecular weight of the fluorine-type oil | | | |
|---|---|---|---|
| 900 | X X | X | X X |
| 800 | X X | X | X O |
| 700 | O O | O | O O |
| 600 | O O | O | O O |
| 500 | O O | O | O O |
| 400 | O O | O | O O |
| 300 | O O | O | O O |
| Silicone oil | 0 | 50 | 100 |
| Fluorine-type oil [Vol %) | 100 | 50 | 0 |

TABLE 4

Silicone oil — Average molecular weight: 3700; Viscosity: 50 cst

| Average molecular weight of the fluorine-type oil | | | |
|---|---|---|---|
| 900 | X X | X | X X |
| 800 | X X | X | X O |
| 700 | X X | O | O O |
| 600 | O O | O | O O |
| 500 | O O | O | O O |
| 400 | O O | O | O O |
| 300 | O O | O | O O |
| Silicone oil | 0 | 50 | 100 |
| Fluorine-type oil [Vol %) | 100 | 50 | 0 |

TABLE 5

Silicone oil — Average molecular weight: 6,000; Viscosity: 100 cst

| Average molecular weight of the fluorine-type oil | | | |
|---|---|---|---|
| 900 | X X | X | X X |
| 800 | X X | X | X X |
| 700 | X X | X | O O |
| 600 | X X | O | O O |
| 500 | O O | O | O O |
| 400 | O O | O | O O |
| 300 | O O | O | O O |
| Silicone oil | 0 | 50 | 100 |
| Fluorine-type oil [Vol %) | 100 | 50 | 0 |

TABLE 6

Silicone oil — Average molecular weight: 25,000; Viscosity: 1,000 cst

| Average molecular weight of the fluorine-type oil | | | |
|---|---|---|---|
| 900 | X X | X | X X |
| 800 | X X | X | X X |
| 700 | X X | X | O O |
| 600 | X X | X | O O |
| 500 | O O | O | O O |
| 400 | O O | O | O O |
| 300 | O O | O | O O |
| Silicone oil | 0 | 50 | 100 |
| Fluorine-type oil [Vol %) | 100 | 50 | 0 |

TABLE 7

Silicone oil — Average molecular weight: 57,000; Viscosity: 10,000 cst

| Average molecular weight of the fluorine-type oil | | | |
|---|---|---|---|
| 900 | X X | X | X X |
| 800 | X X | X | X X |
| 700 | X X | X | X O |
| 600 | X X | X | O O |
| 500 | O O | O | O O |
| 400 | O O | O | O O |
| 300 | O O | O | O O |
| Silicone oil | 0 | 50 | 100 |
| Fluorine-type oil [Vol %) | 100 | 50 | 0 |

We claim:

1. A flame resistant oil comprising a fluorine-type oil having a number average molecular weight of from about 300 to about 900 and a miscible silicone oil having a number average molecular weight of from about 160 to about 57,000, wherein the fluorine-type oil and the silicone oil are combined and dissolved in each other with a combination of the respective molecular weights selected from the following combinations I to IV:

| | |
|---|---|
| I | $300 \leqq X \leqq 900$<br>$160 \leqq Y < 400$ |
| II | $300 \leqq X \leqq 700 + 0.02Z^2$<br>$400 \leqq Y < 2,000$ |
| III | $300 \leqq X \leqq 600 + 0.02Z^2$<br>$2,000 \leqq Y < 4,000$ |
| IV | $300 \leqq X \leqq 500 + 0.02Z^2$<br>$4,000 \leqq Y \leqq 57,000$ |

where X is the number average molecular weight of the fluorine-type oil, Y is the number average molecular weight of the silicone oil, and Z is the % by volume of the silicone oil in the flame resistant oil and $10 \leqq Z \leqq 50$.

2. The flame resistant oil according to claim 1, wherein the fluorine-type oil is a chlorotrifluoroethylene low molecular weight polymer.

3. The flame resistant oil according to claim 1, wherein the silicone oil is dimethylpolysiloxane.

4. The flame resistant oil according to claim 1, wherein the fluorine-type oil is a copolymer of propylene and tetrafluoroethylene.

5. The flame resistant oil according to claim 1, wherein the fluorine-type oil is a perfluoroether oligomer.

6. The flame resistant oil according to claim 1, wherein the fluorine-type oil is a fluorinated oxetane.

7. The flame resistant oil according to claim 1, wherein the fluorine-type oil is a fluorinated polyphenyl ether.

8. The flame resistant oil according to claim 1, wherein the fluorine-type oil is a perfluoroamine.

9. The flame resistant oil according to claim 1, wherein the silicone oil is phenylmethylpolysiloxane.

10. The flame resistant oil according to claim 1, wherein said oil additionally contains $ClF_3$, $MnF_3$, $AgF_2$, $CoF_3$ or nascent chlorine.

11. The flame resistant oil according to claim 1, wherein said oil additionally contains a stabilizer which is benzofuran, 1,2-benzopyran, an epoxy compound, an organic tin compound, an episulfide derivative, a cyclic silane compound, a phosphite compound, or a phosphine sulfide compound.

* * * * *